United States Patent [19]

Streeter

[11] Patent Number: 4,910,913

[45] Date of Patent: Mar. 27, 1990

[54] PAPER VASE AND BLANK FOR FORMING SAME

[76] Inventor: Ken M. Streeter, 2671 36th SW., Seattle, Wash. 98126

[21] Appl. No.: 333,558

[22] Filed: Apr. 4, 1989

[51] Int. Cl.[4] ............................................. A01G 9/02
[52] U.S. Cl. ......................................... 47/72; 229/108
[58] Field of Search ...................... 47/72, 66; 229/108, 229/111, 112; 52/DIG. 10

[56] References Cited

U.S. PATENT DOCUMENTS

| | | | |
|---|---|---|---|
| 404,585 | 6/1889 | Wright. | |
| 715,789 | 12/1902 | Haas | 229/111 |
| 797,175 | 8/1905 | Collenburg | 47/72 |
| 2,150,453 | 3/1939 | Mulford et al. | 47/37 |
| 2,340,373 | 2/1944 | Gardner | 47/37 |
| 2,540,707 | 2/1951 | Beukelman | 47/72 |
| 3,373,917 | 3/1968 | Cox | 229/14 |
| 4,209,092 | 6/1980 | Jones | 206/423 |
| 4,347,686 | 9/1982 | Wood | 47/73 |
| 4,714,190 | 12/1987 | Morrocco | 229/112 |

FOREIGN PATENT DOCUMENTS 97928  7/1898  Fed. Rep. of Germany ...... 229/108

Primary Examiner—David A. Scherbel
Assistant Examiner—Michele A. VanPatten
Attorney, Agent, or Firm—Graybeal, Jensen & Puntigam

[57] ABSTRACT

A blank, stored in a flat condition including fold lines and cuts to form a paper vase having a flat triangular bottom, tapered sides and an irregular sculptured upper edge.

3 Claims, 2 Drawing Sheets

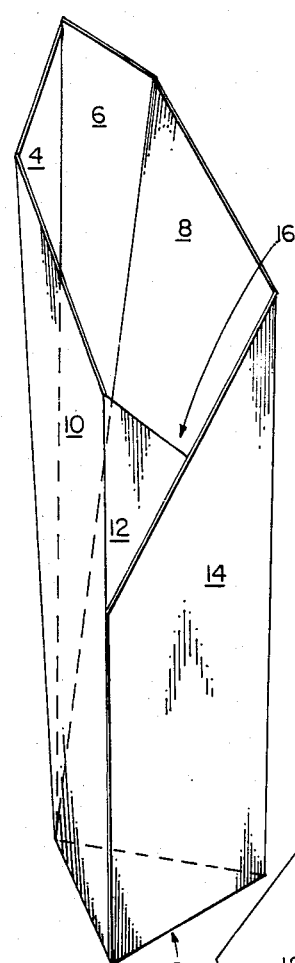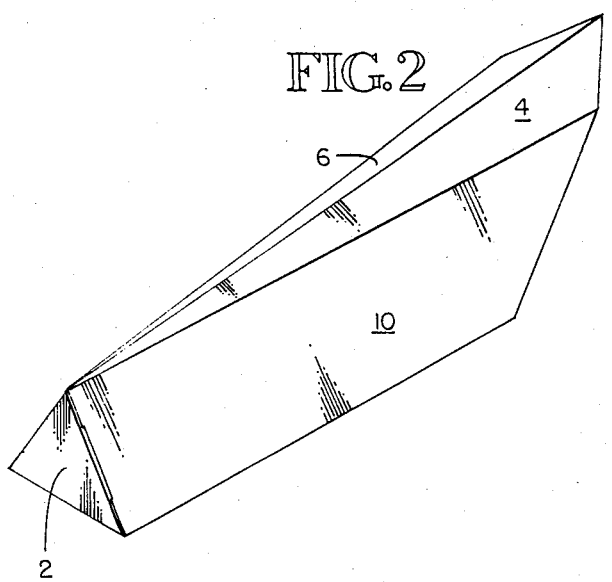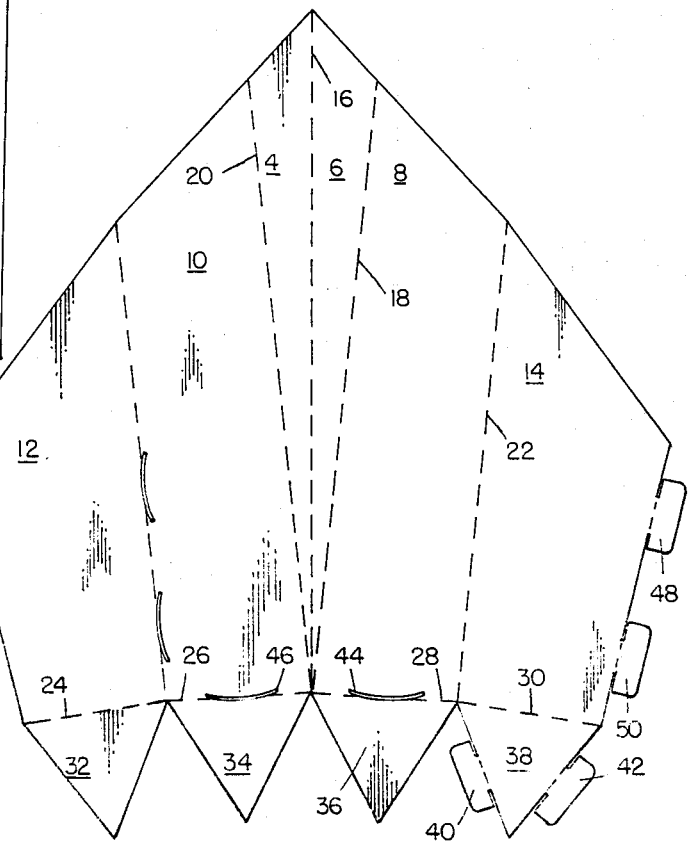

PAPER VASE AND BLANK FOR FORMING SAME

TECHNICAL FIELD

This invention relates to a paper vase structure, and, more particularly, to a paper vase which can be stored in a precut blank configuration having fold lines formed thereon such that it may quickly and easily be formed into an attractive three-dimensional vase including a flat triangular bottom, outwardly flared, tapered sides and a sculptured top edge.

BACKGROUND OF THE INVENTION

Cut flowers have become increasingly popular and are sold at florists, in grocery stores or the like, and often by street vendors. One of the disadvantages of buying cut flowers at the less expensive outlets, i.e., street vendors and/or supermarkets, is that they are often delivered to you, and you hence deliver them, in unattractive plastic bags.

A viable alternative to the plastic bag is a, heretofore unavailable, attractive vase structure which is inexpensive and may be stored in a flat condition, but quickly and easily assembled into a water-and-stem-holding container.

Prior art known to the inventor, in addition to the plastic bag method described hereinabove, includes U.S. Pat. No. 404,585 granted to Wright, June 4, 1889, which discloses a pot made of paper having its bottom folded inwardly such that once the pot, containing dirt and rootball are positioned in the appropriate place beneath the soil, the pot is pulled upwardly providing a protective shield for the seedling.

U.S. Pat. No. 2,150,453 granted to Mulford, et al., Mar. 14, 1939, discloses several packages which may be constructed from precut and prefolded blanks to form a flower pot. A bulb, purchased in the pot, may be grown in the pot by the purchaser such that the bulb may never need to be transplanted.

U.S. Pat. No. 2,340,373 granted to Gardner, Feb. 1, 1944, discloses a plant pack that includes a single-piece exterior shipping container and interior means to secure the plant within the container preventing movement during shipping.

U.S. Pat. No. 3,373,917 granted Mar. 19, 1968 to Cox, discloses a cup including a foldable exterior casing and a fluid-impervious liner.

U.S. Pat. No. 4,209,092 granted June 24, 1980 to Jones, discloses a plant container fabricated of a single sheet of material having predetermined fold lines and including a sealing strip for securing the container in its usable three-dimensional configuration.

U.S. Pat. No. 4,347,686 granted Sept. 7, 1982 to Wood, discloses a container for plant life which is folded such that it forms a cone or pyramid for facilitating aerial planting. The device may include a solid nose piece and fins for guidance.

DISCLOSURE OF THE INVENTION

With the above-noted prior art in mind, it is an object of the present invention to provide a unique, simple, yet attractive container for cut flowers or the like; said container fabricated of a single piece of paper material.

It is another object of the present invention to provide a container for cut flowers or the like which may be stored in the flat condition and quickly formed into a three-dimensional container for cut flowers or the like.

It is still a further object of the present invention to provide a blank for forming a container wherein the blank includes a minimum of four main panels, each with identical equilateral triangles secured to the bottom thereof for forming a planar bottom to the container.

It is still a further object of the present invention to provide a precut blank having preselected fold lines such that the container when completed will be of an irregular, attractive configuration to hold cut flowers or the like.

Yet another object of the present invention is to provide a paper vase having a decorative exterior and folded such that the same decorative surface appears upon the exposed interior.

BRIEF DESCRIPTION OF THE DRAWINGS

FIG. 1 is a pictorial representation of one specie of the present invention and the erect or completed configuration.

FIG. 2 is a plan view of the blank used for forming the container of FIG. 1.

FIG. 3 is a pictorial representation of the specie of FIG. 1 from a different perspective.

BEST MODE FOR CARRYING OUT THE INVENTION

Figure 4:
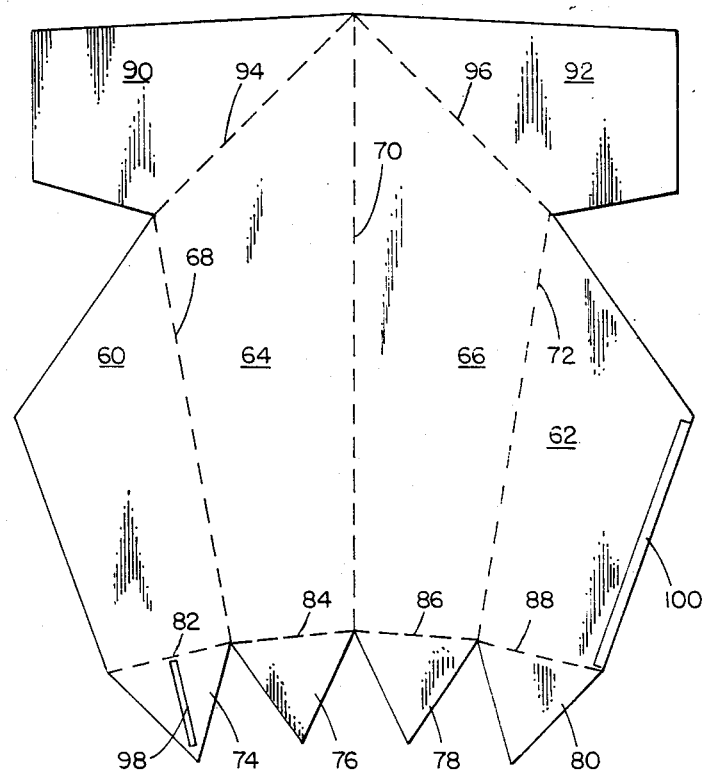
FIG. 4 is a plan view of a blank for forming a second species of the present invention.

Referring now to FIG. 1. One specie of the present invention is shown in its completed form and includes a flat-bottom 2 which is the configuration of a equilateral triangle, as described hereinafter, and an upstanding open-topped body including a pair of identical front panels 4, 6 each in the shape of a scalene triangle, see FIG. 2, having the smallest acute angle at the bottom, a pair of identical side panels 8, 10 each being in the configuration of a trapezoid having its longest base be the fold line between the side panel and the adjacent scalene triangle. A back panel is formed of overlapping identical quadrilaterals 12, 14 such that they form a back panel including a central notch 16. In use, the vase may be secured in its useful expanded three-dimensional condition by means of tabs, as explained hereinafter, or by adhesive, further as explained hereinafter. In use, a plastic bag would be placed within the container to prevent the leakage of any liquid that might be present upon the stems when placed in the container, and also to provide a receptacle for water should the user decide to store and display the plants within the container.

Referring now to FIG. 2 which is the blank from which the structure of FIG. 1 is fabricated, identical numbers are used to identify identical elements.

Each of the panels are identified and defined in configuration by either a cut line or by a fold line. Scalene triangles 4 and 6 have a fold line 16 in common which is the longest of the three sides of the triangle in this embodiment. Scalene triangle 6 and trapezoid 8 have fold line 18 in common which is the longest base of trapezoid 8 and the second longest side of scalene triangle 6. Likewise rhombus 10 and scalene triangle 4 have fold line 20 in common. Quadrilateral 12 and rhombus 10 have fold line 20 in common, and quadrilateral 14 and rhombus 8 have fold line 22 in common.

It is to be noted that the bottom of each of the panels as seen in FIG. 2, with the exception of scalene triangles 4 and 6, has secured thereto by fold lines 24, 66, 28, and 30, equilateral triangles 32, 34, 36, and 38.

In this embodiment, it is to be noted that there are two outwardly projecting tabs 40, 42 on the cut or free edges of equilateral triangle 38. When the vase is assembled, these tabs will respectively be inserted into slots 44 and 46 found respectively on the fold lines adjoining triangle 36 with rhombus 8 and triangle 34 with rhombus 10.

Also to be noted are outwardly projecting tabs 48, 50 on the exterior edge of quadrilateral 14 which are inserted into slots 52, 54 along the fold line 20 when device is assembled. As will be obvious, when assembled, the four equilateral triangles 32, 34, 36, 38 form a multilayered rigid flat base and quadrilaterals 12 and 14 overlap forming the back panel defining the notch 16.

The interrelationship between the elements in this finished container may be seen from a different perspective in FIG. 3; note the triangular, planar bottom 2 with the body flaring upwardly and outwardly to form the finished vase.

Reference is now had to FIG. 4 wherein a similar but slightly modified embodiment is shown. The main body portion is fabricated of four quadrilaterals 60, 62, 64, 66 wherein 60 and 62 are identical quadrilaterals, and 64, 66 are identical quadrilaterals. Quadrilateral 60 is joined to quadrilaterial 64 along fold line 68; quadrilateral 64 is joined to quadrilateral 66 along fold line 70; and quadrilateral 66 is joined to quadrilateral 62 along fold line 72. Along the bottom edge of each of the quadrilateral 60 through 66 is an equilateral triangle respectively 74, 76, 78, 80 joined to the respective quadrilateral by fold lines 82, 84, 86, 88. A tab 90 and a tab 92 are respectively joined to the upper edge of quadrilateral 64 and 66 along fold lines 94, 96 such that when the vase is assembled, these two tabs will be folded inwardly forming an interior liner having an identical decorative surface as does the remainder of exterior of the vase. In this embodiment adhesive strips 98 and 100 are utilized to maintain the container in its assembled condition.

Thus, as can be seen, the present invention provides an inexpensive and attractive means for transporting and/or displaying cut flowers or the like, wherein the vase may be easily stored in a flat condition and quickly aassembled when needed.

I claim:
1. A paper blank for forming a vase comprising:
   four adjacent main panels joined by fold lines, the configuration of interior panels being mirror images and two exterior panels being mirror images, each panel including along a bottom edge, substantially identical equilateral triangular tabs attached to the panels by a fold line which forms one side of the triangle, each of the main panels being a quadrilateral with equal sides having the shorter of their opposing sides on exterior and bottom edges of that panel and including means to secure the device in a folded condition as a vase.
2. A blank as in claim 1 wherein each of the two adjacent interior panels include an optional fold line extending from the bottom of the intersection of the interior panels to the top at a point spaced from the panel intersection.
3. A container for cut flowers or the like comprising:
   a flat base in the configuration of an equilateral triangle, an upstanding body including a front comprising a pair of identical scalene triangles having the identical acute angle adjacent one angle of the base, a pair of identical side panels in the form of trapezoid each having their larger base forming a side of each of the scalene triangles and a back joining the two sides, said back including a central notch at its upper edge, said container fabricated from one piece of material.

* * * * *